US008810386B2

(12) United States Patent
Yu et al.

(10) Patent No.: US 8,810,386 B2
(45) Date of Patent: Aug. 19, 2014

(54) COLLISION AVOIDANCE METHOD FOR TRANSMITTING DATA FROM MULTIPLE WIRELESS TIRE CONDITION SENSORS

(75) Inventors: Hung-Chih Yu, Taichung (TW); Yi-Sheng Lin, Taichung (TW)

(73) Assignee: Orange Electronic Co., Ltd., Taichung (TW)

(*) Notice: Subject to any disclaimer, the term of this patent is extended or adjusted under 35 U.S.C. 154(b) by 309 days.

(21) Appl. No.: 13/295,166

(22) Filed: Nov. 14, 2011

(65) Prior Publication Data
US 2013/0076500 A1 Mar. 28, 2013

(30) Foreign Application Priority Data
Sep. 28, 2011 (TW) .............................. 100135003 A

(51) Int. Cl.
*H04Q 9/00* (2006.01)
*B60C 23/00* (2006.01)
*B60C 23/04* (2006.01)
*H04W 72/02* (2009.01)
*H04W 84/18* (2009.01)

(52) U.S. Cl.
CPC ............ *B60C 23/0457* (2013.01); *H04W 84/18* (2013.01); *B60C 23/0464* (2013.01); *H04W 72/02* (2013.01)
USPC .......... 340/445; 340/447; 340/442; 340/10.1; 340/10.2; 340/10.34; 340/10.52

(58) Field of Classification Search
None
See application file for complete search history.

(56) References Cited

U.S. PATENT DOCUMENTS

| 7,269,530 | B1* | 9/2007 | Lin et al. ...................... 702/141 |
| 7,626,488 | B2* | 12/2009 | Armstrong et al. ........... 340/10.2 |
| 7,626,946 | B2* | 12/2009 | Date et al. ..................... 370/254 |
| 8,514,056 | B2* | 8/2013 | Mickle et al. .................. 340/8.1 |
| 2002/0063622 | A1* | 5/2002 | Armstrong et al. ......... 340/10.31 |
| 2004/0036589 | A1* | 2/2004 | Lin ............................... 340/445 |
| 2007/0075834 | A1* | 4/2007 | Armstrong et al. .......... 340/10.1 |
| 2008/0088453 | A1* | 4/2008 | Kiji et al. ..................... 340/572.1 |
| 2011/0074552 | A1* | 3/2011 | Norair et al. ................. 340/10.1 |

FOREIGN PATENT DOCUMENTS

JP         2013073616 A    *   4/2013

* cited by examiner

*Primary Examiner* — Julie Lieu
(74) *Attorney, Agent, or Firm* — C. G. Mersereau; Nikolai & Mersereau, P.A.

(57) ABSTRACT

A collision avoidance method for transmitting data from multiple wireless tire condition sensors on a vehicle is executed by each wireless tire condition sensor having a unique ID and multiple different wake-up times. After the sensor is operated to sense data, the method has steps of reading the ID and computing a determination value with the ID and a variable, selecting one of the wake-up times according to the determination result, and after the selected wake-up time expires, transmitting the sensed data. As the selected wake-up times of the sensors differ from one another, data collision at the receiving end arising from data transmission from the sensors can be avoided. Additionally, besides the wake-up time, a time gap between data transmitted twice consecutively from each sensor can be employed to achieve data collision avoidance.

10 Claims, 3 Drawing Sheets

COLLISION AVOIDANCE METHOD FOR TRANSMITTING DATA FROM MULTIPLE WIRELESS TIRE CONDITION SENSORS

BACKGROUND OF THE INVENTION

1. Field of the Invention

The present invention relates to a method for transmitting data from multiple wireless tire condition sensors, and more particularly to a collision avoidance method for transmitting data from multiple wireless tire condition sensors.

2. Description of the Related Art

Tires are one of the most important items on vehicles. The condition of tires is critical to driving safety. To facilitate drivers' constant awareness of tire pressure, most new vehicles come with wireless tire pressure monitoring system. The wireless pressure monitoring system has multiple wireless tire condition sensors respectively mounted in all tires of a vehicle, wirelessly transmits acquired tire pressure information to a wireless tire pressure receiver inside the vehicle on a periodic or random basis, and provides tire pressure information to the driver at all time after the tire pressure information is analyzed and displayed by the wireless tire pressure receiver for the driver to quickly respond to an abnormal tire pressure condition.

With reference to FIG. 3, a conventional wireless tire pressure monitoring system has at least four wireless tire condition sensors 71~74 and a wireless tire pressure receiver 70. Each wireless tire condition sensor 71~74 has a control unit, a sensing element, a wireless high-frequency transmission circuit, a wireless low-frequency reception circuit and a power supply. Each wireless tire condition sensor 71~74 has an exclusive 8-bit code or code with higher bits before delivery.

When activated, each tire pressure sensor 71~74 starts using the wireless high-frequency transmission circuit to periodically or randomly transmit sensed tire pressure information and its exclusive code encoded specifically to the wireless tire pressure receiver 70. After receiving and decoding the encoded information, the wireless tire pressure receiver 70 first checks the exclusive code to identify if the received tire condition information pertains to in-vehicle information or comes from other vehicles. If the latter is the case, the received tire condition information is discarded to avoid further processing of the tire condition information of other vehicles. If the former is the case, the wireless tire pressure receiver 70 determines from which tire the received tire condition information comes and further analyzes tire pressure, temperature and other relevant parameters contained in the tire condition information.

As the single wireless tire pressure receiver 70 serves to receive tire condition information from all the wireless tire condition sensors 71~74 alone, a feasible method is to separate the data transmission time of all the wireless tire condition sensors 71~74 in a vehicle. Although theoretically feasible, if the data transmission cycle of each wireless tire condition sensors 71~74 is fixed, the data transmission cycles of some wireless tire condition sensors 71~74 eventually overlap after the wireless tire condition sensors 71~74 continue transmitting data for a period of time. Data collision thus occurs in the wireless tire pressure receiver 70 when the data transmission cycles of the wireless tire condition sensors 71~74 overlap.

To solve the overlap of the data transmission cycles of the wireless tire condition sensors 71~74, another method is to increase the frequency of data transmission in the data transmission cycles of each wireless tire condition sensor 71~74. Conventional wireless tire condition sensors 71~74 actually transmit tire condition information multiple times in a data transmission cycle. If the frequency of transmitting tire condition information in each data transmission cycle increases, the possibility of data collision can be relatively reduced and the tire condition information transmitted by the tire pressure sensors 71~74 can all be successfully received by the wireless tire pressure receiver 70.

Similar technique is disclosed in U.S. Pat. No. 6,486,773, entitled "Method for communicating data in a remote tire pressure monitoring system", wherein each wireless tire condition sensor 71~74 transmits tire condition information multiple times in a data transmission cycle, and a wake-up time for the wireless pressure sensor 71~74 to wait each time when data transmission of the tire condition information occurs can be preset with a time duration differing from those for the rest of wireless pressure sensors 71~74 to wait at the same time spot when data transmission of tire condition information of the rest of wireless pressure sensors 71~74 occurs. Suppose that the data transmission cycle is 42 microsecond ($\mu$s) and total number of data transmission in each data transmission cycle is eight, one of the wireless tire condition sensors 71 is preset with a wake-up time sequence represented by (6, 8, 6, 6, 4, 4, 4, 4), another wireless tire condition sensor 72 is preset with a different wake-up time sequence represented by (4, 4, 6, 8, 6, 6, 4, 4), and the wake-up time is measured in microseconds. In a data transmission cycle, the wireless tire condition sensor 71 first waits 6 $\mu$s before transmitting tire condition information for the first time, then waits 8 $\mu$s before transmitting the tire condition information for the second time and waits the wake-up time in the remaining wake-up time sequence (6, 6, 4, 4, 4, 4) before transmitting the tire condition information for the rest of six more times respectively. Similarly, the wireless tire condition sensor 72 waits to transmit tire condition information thereof eight times according to the wake-up time sequence (4, 4, 6, 8, 6, 6, 4, 4). Given the method, each wireless tire condition sensor 71~74 can transmit same tire condition information multiple times in each data transmission cycle to ensure that the wireless tire pressure receiver 70 does not lose tire condition information transmitted from any one of the wireless tire condition sensors 71~74 due to data collision among the wireless tire condition sensors 71~74.

Taiwanese Patent Publication No. 200736079 or U.S. Pat. No. 7,269,530, entitled "Method for wirelessly transmitting sensed signals of tires" also discloses that each wireless tire condition sensor 71~74 transmits same tire condition information multiple times in a data transmission cycle. A wake-up time sequence is similarly set up for same tire condition information of each wireless tire condition sensor 71~74 transmitted multiple times in the data transmission cycle to ensure that the wireless tire pressure receiver 70 does not lose tire condition information transmitted from any one of the wireless tire condition sensors 71~74 due to data collision among the wireless tire condition sensors 71~74. The method differs from the foregoing method in further taking acceleration of vehicle into account to calculate the time spent for each turn of a tire and allocating the time for each turn to a number of data transmission for tire condition information. For instance, suppose that each turn of the tire takes 90 $\mu$s and the number of data transmission for tire condition information N=3, the time allocated to a wake-up time for transmitting tire condition information once is 30 $\mu$s, that is, each wireless tire condition sensor 71~74 sequentially transmits same tire condition information thrice with the same wake-up time in each turn of the tire.

However, the drawbacks of the foregoing methods lie in that as each wireless tire condition sensor 71~74 is hermetically mounted in a corresponding tire, and battery replacement for the wireless tire condition sensors 71~74 is not as convenient as that for regular electronic equipment. Hence, the wireless tire condition sensors 71~74 must be efficient in terms of power management. Higher frequency of data transmission in each data transmission cycle gives rise to more power consumption contradicting the principle of power management for the wireless tire condition sensors 71~74.

U.S. Pat. No. 6,931,923, entitled "Tire condition monitoring apparatus" discloses another technique having a transmitter-receiver 40 and four transponders 30. The transmitter-receiver 40 is mounted inside a vehicle and the four transponders 30 are respectively mounted in four tires. The transmitter-receiver 40 transmits interrogating radio waves to the transponder 30 in each tire for the transponder 30 to reply with tire condition data, such as tire pressure and the like.

The transmitter-receiver 40 wirelessly transmits an inquiry multiple times to each transponder 30 within a first time duration so that the transponder 30 within each tire can reply with sensed tire condition information. The first time duration is determined in accordance with a speed of the vehicle, and a number of the inquiry transmitted within the first time duration varies with the vehicle speed. For instance, when the vehicle speed is slower than 100 km, the number of the inquiry is once per minute, and when the vehicle speed is faster than 100 km but equal to or lower than 200 km, the number of the inquiry is twice per minute.

To ensure that the transmitter-receiver 40 can receive tire condition information transmitted by each transponder 30, a relative angle between an antenna of the transmitter-receiver 40 and the transponder 30 mounted on a rim of a wheel is further considered so as to determine a number of the transponder 30 transmitting and receiving signals in a turn of the tire. The tire condition monitoring apparatus determines the number with totally five equations as follows.

Equation 1 serves to calculate the revolution per second R(20) of the tire when the vehicle speed is 20 km per hour.

Equation 2 serves to calculate the time spent for each revolution of the tire when the vehicle speed is 20 km per hour.

Equation 3 serves to calculate the time Tp of the transponder 30 located within an optimal detection angle (relative to an antenna 41) in each revolution of the tire when the vehicle speed is 20 km per hour.

Equation 4 serves to calculate the time Tk of the transponder 30 located within the optimal detection angle (relative to an antenna 41) after deducting the time spent for each inquiry of the transmitter-receiver 40.

Equation 5 serves to calculate the number of inquiry between the transmitter-receiver 40 and each transponder 30 using Tp and Tk within each revolution of the tire when the vehicle speed is 20 km per hour.

To correctly receive tire condition information transmitted from each transponder 30, the tire condition monitoring apparatus employs many equations to calculate the number of inquiry for tire condition information within each revolution at a specific vehicle speed. As a result of many equations involved, the conventional tire condition monitoring apparatus are more complicated technically and the cost thereof is relatively higher.

SUMMARY OF THE INVENTION

An objective of the present invention is to provide a collision avoidance method for transmitting data from multiple wireless tire condition sensors and effectively avoiding data collision occurring at a receiving end.

To achieve the foregoing objective, the collision avoidance method for transmitting data from multiple wireless tire condition sensors mounted on a vehicle is executed by each wireless tire condition sensor having a unique ID and multiple wake-up times differing in time duration after the wireless tire condition sensor is operated to sense tire condition information and has steps of:

reading the ID thereof and computing to obtain a determination value with the ID and a first variable;

determining if the determination value satisfies a preset condition;

selecting one of the wake-up times according to the determination result;

after the selected wake-up time expires, starting transmitting the sensed tire condition information;

determining if an update computation condition is satisfied; and if the update computation condition is satisfied, computing a new determination value with the ID and a second variable and resuming the step of determining if the determination value satisfies the preset condition.

The above-mentioned method computes with the ID and a first variable of each wireless tire condition sensor mounted on a vehicle to dynamically select a corresponding wake-up time before the wireless tire condition sensor transmits data, and after the wake-up time expires, start transmitting the data. As the ID of each wireless tire condition sensor is unique, the wireless tire condition sensors can be activated to transmit data at different time spots. After transmitting data, the method further determines if an update computation condition is satisfied, and further computes with the ID and a second variable to select a different wake-up time if positive, so as to effectively avoid data collision occurring when the wireless tire condition sensors transmit data to a receiving end at the least common multiple of the different wake-up times.

Alternatively, the collision avoidance method for transmitting data from multiple wireless tire condition sensors mounted on a vehicle is executed by each wireless tire condition sensor having a unique ID and multiple different time gaps each defined between two consecutive transmissions of a corresponding wireless tire condition sensor, after the wireless tire condition sensor is operated to sense tire condition information, and has steps of:

reading the ID thereof and computing to obtain a determination value with the ID and a first variable;

determining if the determination value satisfies a preset condition;

selecting one of the time gaps according to the determination result;

transmitting the sensed tire condition information according to the selected time gap;

determining if an update computation condition is satisfied; and if the update computation condition is satisfied, computing a new determination value with the ID and a second variable and resuming the step of determining if the determination value satisfies the preset condition.

The above-mentioned method computes with the ID and a first variable of each wireless tire condition sensor mounted on a vehicle to dynamically select a corresponding time gap before the wireless tire condition sensor transmits data, and transmits the data according to the selected time gap. As the ID of each wireless tire condition sensor is unique, the wireless tire condition sensors can transmit data at different time spots. After transmitting data, the method further determines if an update computation condition is satisfied, and further computes with the ID and a second variable to select a different time gap if positive, so as to effectively avoid data collision occurring when the wireless tire condition sensors transmit data to a receiving end at the least common multiple of the different time gaps. In contrast to the conventional methods, the present invention computes to select a wake-up time or time gap with just an ID and a first variable for avoiding data collision during data transmission to a receiving end, thereby achieving to be less complicated technically and less costly.

Other objectives, advantages and novel features of the invention will become more apparent from the following detailed description when taken in conjunction with the accompanying drawings.

DETAILED DESCRIPTION OF THE INVENTION

Figure 1:
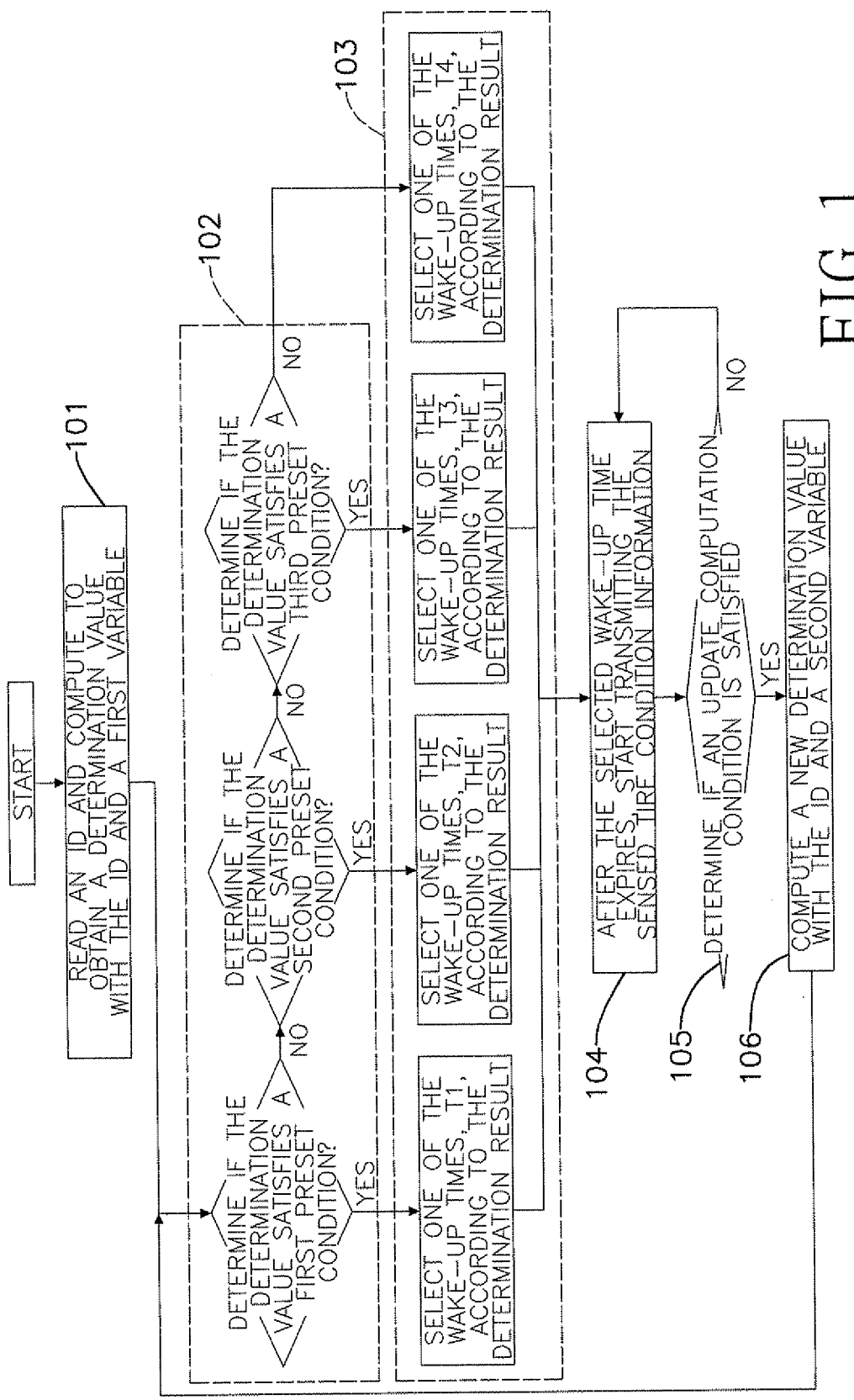
FIG. 1 is a flow diagram of a first embodiment of a collision avoidance method for transmitting data from multiple wireless tire condition sensors in accordance with the present invention.

With reference to FIG. 1, a first embodiment of a collision avoidance method for transmitting data from multiple wireless tire condition sensors in accordance with the present invention represents operation processes for a built-in wireless tire condition sensor of a wireless tire pressure monitoring system to transmit tire condition information. Given a four-wheel vehicle as an example, each of the four tires has a wireless tire condition sensor mounted therein, that is, the wireless tire pressure monitoring system has four wireless tire condition sensors and each wireless tire condition sensor has the operation processes embedded therein as shown in FIG. 1. Each wireless tire condition sensor has a unique ID (identification) and multiple wake-up times with different lengths of time. In the present embodiment, each wireless tire condition sensor has four wake-up times embedded therein as indicated by T1, T2, T3 and T4. When each wireless condition sensor is operated to detect tire condition information, the collision avoidance method is executed by the wireless tire condition sensor and has the following steps.

Step 101: Read an ID and compute to obtain a determination value with the ID and a first variable.

Step 102: Determine if the determination value satisfies a preset condition.

Step 103: Select one of the wake-up times according to the determination result. As disclosed earlier, each wireless tire condition sensor has a unique ID and four wake-up times embedded therein. The determination value computed with the ID and the first variable determines which one of the wake-up times is selected. As the ID embedded in each wireless tire condition sensor is unique, the wake-up time selected by the determination value computed with the ID and the first variable is also unique.

Step 104: After the selected wake-up time expires, start transmitting the sensed tire condition information.

Step 105: Determine if an update computation condition is satisfied. In the present embodiment, the update computation condition is used to determine if the corresponding wireless tire condition sensor having the ID has been operated over a period of time or transmitted tire condition information over a preset time period.

Step 106: If the update computation condition is satisfied, compute a new determination value with the ID and a second variable and resume Step 102 to designate a different wake-up time for transmitting the sensed tire condition information again.

In the present embodiment, after each wireless tire condition sensor in the wireless tire condition monitoring system is operated, a determination value is computed with a corresponding ID and a first variable to dynamically select a corresponding wake-up time. After the selected wake-up time expires, the wireless tire condition sensor is operated again to transmit the sensed tire condition information. As the ID of each wireless tire condition sensor is unique, the way of dynamically designating a wake-up time corresponding to the determination value computed with the ID and the first variable can ensure tire condition information transmitted by all the wireless tire condition sensors of the wireless tire condition monitoring system does not collide with one another at the receiving end (a wireless tire condition receiver) of the wireless condition monitoring system. After the tire condition information is transmitted, further determine if an update computation condition is satisfied. If negative, transmit the sensed tire condition information with the current wake-up time. Otherwise, compute an updated determination value. In the present embodiment, the update computation condition may be one of the cases, that is, the wireless tire condition sensor has been operated over a period of time, such as 30 minutes, or the number of data transmission has exceeded a specific frequency, such as 50 times. If any of the conditions is satisfied, compute an updated determination value. In the present embodiment, computing the updated determination value is performed by adding the ID read by the wireless tire condition sensor and a first variable. Thus, the determination values computed with the IDs of all the wireless tire condition sensors differ from one another, and the wake-up times selected according to the determination values can therefore differ from one another. Accordingly, tire condition information transmitted by all the wireless tire condition sensors does not collide with one another.

Figure 2:
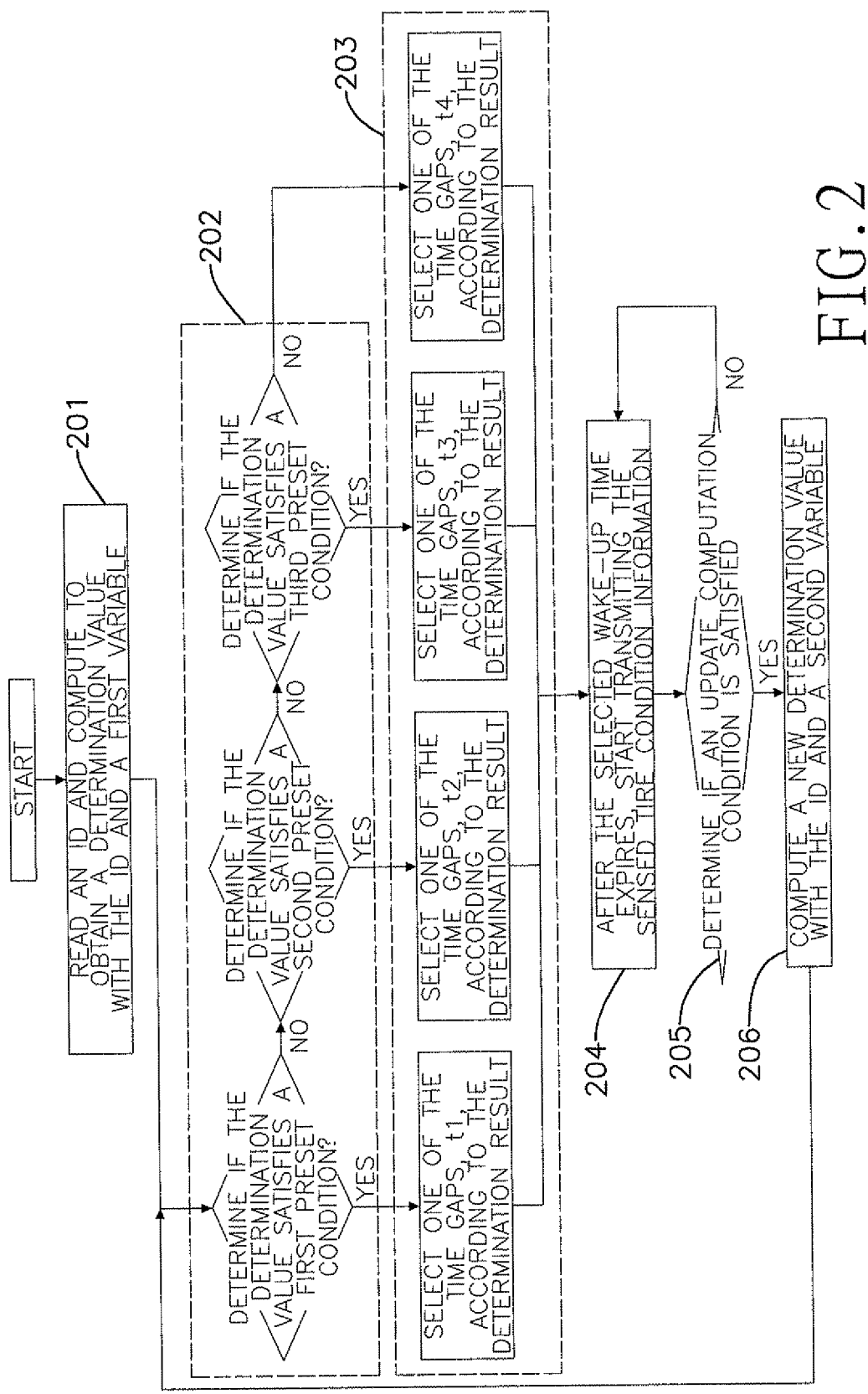
FIG. 2 is a flow diagram of a second embodiment of a collision avoidance method for transmitting data from multiple wireless tire condition sensors in accordance with the present invention.
Figure 3:
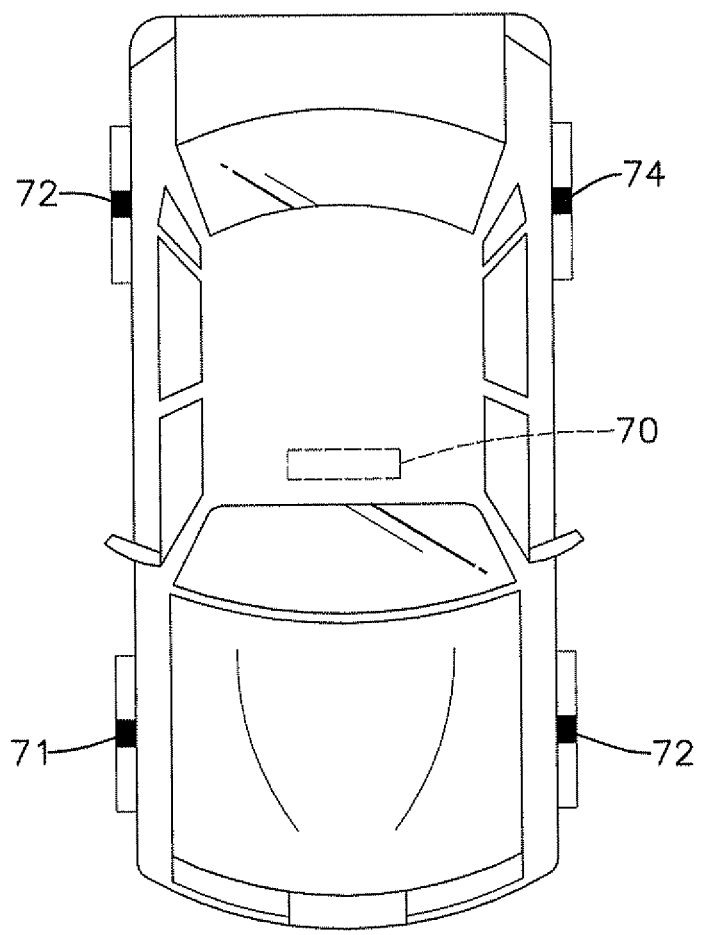
FIG. 3 is a schematic diagram of a conventional wireless tire pressure monitoring system.

With reference to FIG. 2, a second embodiment of a collision avoidance method for transmitting data from multiple wireless tire condition sensors in accordance with the present invention differs from the first embodiment in that after the computation with the ID and a first variable, another parameter, a time gap defined between two consecutive transmissions of a corresponding wireless tire condition sensor, is selected to ensure no data collision arising from tire condition information transmitted from the wireless tire condition sensors. When each wireless condition sensor is operated to sense tire condition information, the collision avoidance method is executed by the wireless tire condition sensor and has the following steps.

Step 201: Read an ID and compute to obtain a determination value with the ID and a first variable.

Step 202: Determine if the determination value satisfies a preset condition.

Step 203: Select one of the time gaps according to the determination result. As disclosed earlier, each wireless tire condition sensor has a unique ID and four time gaps embedded therein as indicated by t1, t2, t3 and t4. The determination value computed with the ID and the first variable determines which one of the time gaps is selected. As the ID embedded in each wireless tire condition sensor is unique, the time gap selected by the determination value computed with the ID and the first variable is also unique.

Step 204: Start transmitting the sensed tire condition information according to the selected time gap.

Step 205: Determine if an update computation condition is satisfied.

Step 206: If the update computation condition is satisfied, compute a new determination value with the ID and a second variable and resume Step 202 to select a different time gap for transmitting the sensed tire condition information again.

In the present embodiment, each wireless tire condition sensor has four different time gaps embedded therein as indicated by t1, t2, t3 and t4. According to the computation result computed with the ID and the first variable, one of the time gaps is selected for transmitting the sensed tire condition information. Each wireless tire condition sensor transmits the sensed tire condition information multiple times in a data transmission cycle. The time gap represents the time difference between two consecutive data transmissions of each wireless tire condition sensor. In the present embodiment, 30 milliseconds (ms) are chosen as one unit and four different time gaps, 30 ms, 60 ms, 90 ms and 120 ms are provided. Each wireless tire condition sensor selects one of the four time gaps to transmit the sensed tire condition information in accordance with the computation result with the ID. As the ID of each wireless tire condition sensor is unique, the computation results computed with the IDs of the wireless tire condition sensors are different, and the time gaps selected by the wireless tire condition sensors to transmit the sensed tire condition information thus differ from one another so as to prevent data collision among tire condition information transmitted from the wireless tire condition sensors. After the sensed tire condition information is transmitted, further determine if an update computation condition is satisfied. In the present embodiment, the update computation condition is used to determine if one of the cases occurs, that is, the wireless tire condition sensor has been operated over a period of time, such as 30 minutes, or the number of data transmission has exceeded a specific frequency, such as 50 times. If any of the conditions is satisfied, compute an updated determination value. In the present embodiment, computing the updated determination value is performed by adding the ID read by the wireless tire condition sensor and a first variable. Thus, the determination values computed with the IDs of all the wireless tire condition sensors differ from one another, and the time gaps selected according to the determination values computed by the wireless tire condition sensors can therefore differ from one another. The time gaps t1, t2, t3 and t4 can be also preset to progressively increase or decrease. Accordingly, tire condition information transmitted by all the wireless tire condition sensors does not collide with one another.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A collision avoidance method for transmitting data from multiple wireless tire condition sensors mounted on a vehicle, wherein each wireless tire condition sensor has a unique ID (identification) and multiple wake-up times differing in time duration, the collision avoidance method executed by each wireless tire condition sensor after the wireless tire condition sensor is operated to sense tire condition information and having steps of:
    reading the ID thereof and computing to obtain a determination value with the ID and a first variable;
    determining if the determination value satisfies a preset condition;
    selecting one of the wake-up times according to the determination result;
    after the selected wake-up time expires, starting transmitting the sensed tire condition information;
    determining if an update computation condition is satisfied; and
    if the update computation condition is satisfied, computing a new determination value with the ID and a second variable and resuming the step of determining if the determination value satisfies the preset condition.

2. The collision avoidance method as claimed in claim 1, wherein the update computation condition is used to determine if the wireless tire condition sensor has been operated over a period of time.

3. The collision avoidance method as claimed in claim 1, wherein the update computation condition is used to determine if the wireless tire condition sensor has transmitted the sensed tire condition information over a preset time period.

4. The collision avoidance method as claimed in claim 2, wherein computing the new determination value is performed by adding the ID and the first variable.

5. The collision avoidance method as claimed in claim 3, wherein computing the new determination value is performed by adding the ID and the first variable.

6. A collision avoidance method for transmitting data from multiple wireless tire condition sensors mounted on a vehicle, wherein each wireless tire condition sensor has a unique ID (identification) and multiple different time gaps, and each time gap is defined between two consecutive transmissions of a corresponding wireless tire condition sensor, the collision avoidance method executed by each wireless tire condition sensor after the wireless tire condition sensor is operated to sense tire condition information and having steps of:
    reading the ID thereof and computing to obtain a determination value with the ID and a first variable;
    determining if the determination value satisfies a preset condition;
    selecting one of the time gaps according to the determination result;
    transmitting the sensed tire condition information according to the selected time gap;
    determining if an update computation condition is satisfied; and
    if the update computation condition is satisfied, computing a new determination value with the ID and a second variable and resuming the step of determining if the determination value satisfies the preset condition.

7. The collision avoidance method as claimed in claim 6, wherein the update computation condition indicates that the wireless tire condition sensor has been operated over a period of time.

8. The collision avoidance method as claimed in claim 6, wherein the update computation condition indicates that the wireless tire condition sensor has transmitted the sensed tire condition information over a preset time period.

9. The collision avoidance method as claimed in claim 7, wherein computing the updated determination value is performed by adding the ID and the first variable.

10. The collision avoidance method as claimed in claim 8, wherein computing the updated determination value is performed by adding the ID and the first variable.

\* \* \* \* \*